Sept. 22, 1936.  E. T. CONDON  2,054,808
AUTOMOBILE SIGNAL SWITCH
Filed March 24, 1931
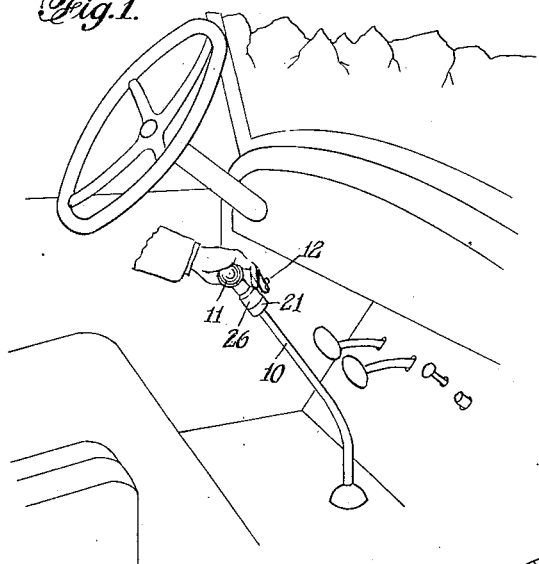
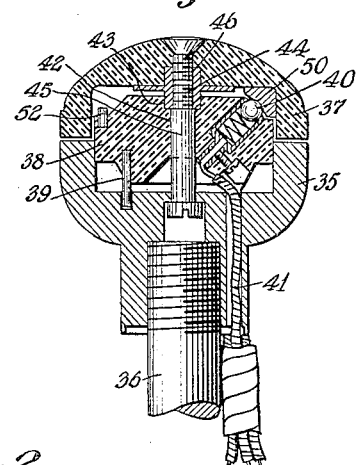
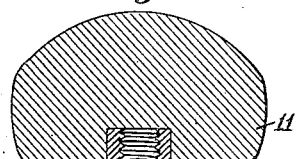
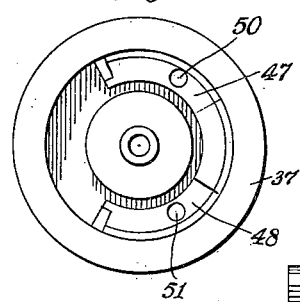
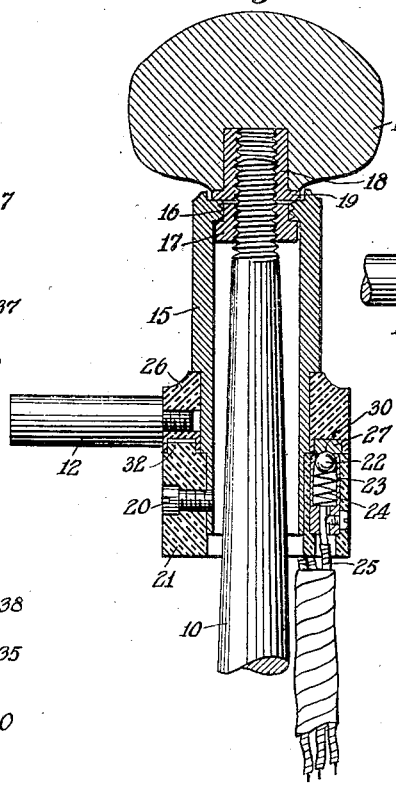
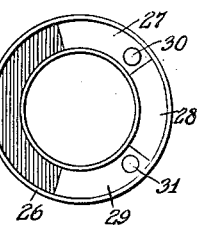
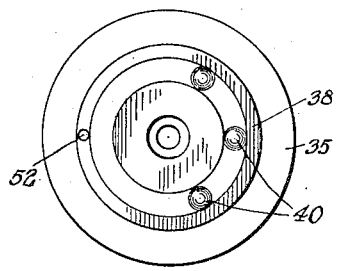
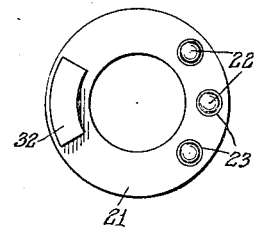
INVENTOR
EDWARD T. CONDON
BY
ATTORNEY Patented Sept. 22, 1936

2,054,808

UNITED STATES PATENT OFFICE 2,054,808

AUTOMOBILE SIGNAL SWITCH

Edward T. Condon, New York, N. Y., assignor to Autoposts Company Inc., New York, N. Y., a corporation of New York Application March 24, 1931, Serial No. 524,990

8 Claims. (Cl. 200—59)

The invention relates to electrical switching apparatus adapted more especially for use with self-propelled vehicles such as automobiles, as, for example, where it is desirable to give indication of the intention of a driver to make a turn either to the right or to the left.

An object of the invention is the provision of a switch mechanism which may conveniently be associated with the shift lever for the transmission mechanism of the automobile.

A further object of the invention resides in a switch mechanism of this character which may conveniently be manipulated without requiring removal of an operator's hand from the knob of the gear shift lever.

The invention has for a still further object the provision of means for adapting the novel switch mechanism to the end of a gear shift lever, and also in the provision of an adapter member for accommodating the switch to levers of different diameters.

In carrying out the invention, there is arranged to be secured to the knob end of a gear shift lever suitable electrical switching mechanism which is located immediately below said knob; or, the entire knob may be replaced by a different knob embodying the switch mechanism. The latter includes cooperating sets of contact elements, one of which is movable relatively to the other set which is fixed with respect to a shift lever.

The nature of the invention, however, will best be understood when described in connection with the accompanying drawing, in which:

Fig. 1 is a fragmentary perspective view of the forward portion of the interior of an automobile, illustrating the manner of operating the novel switch mechanism as installed upon the gear shift lever of the automobile.

Fig. 2 is an enlarged vertical section through the switch mechanism mounted upon the free end of the gear shift lever.

Fig. 3 is an underneath view, and Fig. 4 is a plan view, of the cooperating sets of contact elements.

Fig. 5 is a fragmentary vertical section of a modified switch shown attached to the outer end of a gear shift lever, as a substitute for the usual knob at the end of the lever.

Fig. 6 is an underneath view, and Fig. 7 is a plan view, of the cooperating sets of contact elements of the switch shown in Fig. 5.

Referring to Figs. 1 to 4 of the drawing, 10 designates the gear shift lever of an automobile provided at its upper end with a knob 11 for manipulating said lever in the usual manner. There is mounted, however, over the end of said lever and below the knob thereon electrical switching mechanism for operating, for example, suitable signals (not shown) in accordance with the throw of a rod 12 which projects outwardly and substantially at right angles to the said lever. This rod 12 is so located as to be in proximity to the knob 11 in order that when the same is grasped, as indicated at Fig. 1, the fingers of an operator's hand may also straddle the said rod to rock the same either to the right or left of its normal position. This, as set forth in my copending application Serial No. 430,163, may serve to close circuits for illuminating signal means located respectively on the right and left-hand sides of a car, as on the front fenders thereof, and give notice of intention to make a corresponding turn.

Referring more particularly to Fig. 2 of the drawing, a convenient means for mounting the novel switch mechanism upon the end of a lever is indicated, it being appreciated that there is some variation in the diameters of levers of different cars.

As shown, a sleeve 15 of ample internal diameter to fit over the largest of any of the standard gear shift lever ends is provided, the same being arranged at its outer end with a threaded shoulder 16 for direct connection to the largest diameter lever end met with. For levers of smaller diameters, however, there is utilized an adapter member 17 with flange arranged to abut said shoulder, the adapter being screwed over the usual outer threaded end of a lever. The threaded bushing 18 of knob 11 is then screwed down over the said outer end of the lever with its flange 19 seating in the outer recessed portion of the sleeve 15 designed to accommodate the same. It will be necessary, thereby, merely to provide adapter members of different internal diameters to accommodate a sleeve to the various sizes of gear shift levers.

The lower portion of sleeve 15 has removably secured thereto, as by means of a set screw 20, a hollow cylinder 21 of insulation material and in which is carried a plurality of ball contacts 22, in the present instance three. Each of the ball elements 22 is mounted within a sleeve 23 turned over slightly at its outer end to prevent a ball from passing therethrough, and is backed up by a spring 24 to urge a said ball normally upwardly. Conductors 25 extend from the respective sleeves 23 for external connection.

There is also mounted about said sleeve 15 an annular contact-making element 26 which is oscillatable to a limited extent on the sleeve 15 about the axis of the shift lever, as by means of the rod 12 firmly secured thereto. This annular member is provided with a plurality of contact segments 27 and 29 with intermediate insulation segment 28 and over which are adapted to ride the ball contacts 22 for bridging corresponding circuits.

The said contacts 27 and 29 are embedded in the insulation member 26 flush with segment 28, and contacts 27 and 29 are further provided with depressions or sockets 30 and 31, respectively, into which a corresponding ball contact is adapted to snap and give indication thereby that the proper location has been attained for the particular circuit control desired. A stop segment 32 projecting upwardly from the cylinder 21 serves to limit the oscillation of annular member 26.

It will be appreciated that by causing the fingers to straddle rod 12 (with palm of hand resting upon the knob 11 ready to effect the shifting of the transmission mechanism) a signal change may simultaneously be effected with the shifting operation and without removal of the hand from said knob, as by throwing the rod 12 with the fingers to one side or the other of its normal or neutral position.

The switch mechanism aforesaid may be embodied also in the knob itself, if desired. Reference being had to Figs. 5 to 7, the knob 35 is indicated as fitted to the outer end of a gear shift lever 36 as by screwing the same thereon, the said knob, however, being divided and the upper portion comprising a head 37 of insulation material. A block 38, also of insulation material, is fixedly mounted in the recessed lower portion of the knob and properly located by means of a pin 39; and this block 38 carries a plurality of ball contacts 40, in the present instance three. These are similarly spring-urged, and have conductors 41 in electrical connection therewith for external connection.

The upper or cap portion 37 is designed to be rotatable relatively to the block 38; and to this end the said block is bored axially through as at 42 with a counterbored portion 43 at its upper end. A shouldered screw 44, having the smooth shank portion 45, is designed to thread into a flanged bushing 46 of head 37, the shank passing through the bore 42 to permit the screw to turn freely therein.

By this construction, the head 37 may be held in position over and slightly displaced from the knob portion 35 for effecting engagement between the ball contacts 40 and metal segments 47 and 48 imbedded in the head 37. The segments 47 and 48 are also provided with seating recesses or sockets 50 and 51 respectively for the corresponding ball contacts; and by oscillating the head 37 with the palm of the hand a contact may be made to one or the other of the segments for bridging the desired leads. A stop pin 52 extending upwardly from insulation block 38 limits the extent of oscillation of the top relatively to the block.

I claim:

1. Electrical switching mechanism for a self-propelled vehicle having a gear-shift lever with operating knob and comprising relatively movable means adapted to be mounted coaxially over the free end of said lever immediately below the said knob and extending downwardly therefrom, and the movable one of which carries an element projecting radially outwardly from the lever in close proximity to and below the said operating knob for engagement by the fingers of an operator with hand thereon and oscillatable in a horizontal plane by the fingers of the operator without removal of the hand from said knob, and the other of the means embodying stationary contacts located upon respective sides of a neutral point and adapted to be energized independently by the oscillatable means as the same is turned in the one direction or the other.

2. Electrical switching mechanism for a self-propelled vehicle having a gear-shift lever with operating knob and comprising a sleeve adapted to be secured over the free end of said lever immediately below the said knob and extending downwardly therefrom, an operating handle extending radially outwardly from the sleeve in close proximity to the said operating knob for engagement by the fingers of an operator with hand thereon and oscillatable in a horizontal plane by the fingers of the operator without removal of the hand from said knob, a contact part mounted on said sleeve to rotate with the operating handle in either direction, and cooperating stationary contact means carried by the said sleeve for electrical contact with the rotatable part as the latter is rotated in either direction.

3. Electrical switching mechanism for a self-propelled vehicle having a gear-shift lever with operating knob and comprising an adapter member coaxially secured over the free end of said lever immediately below the said knob and extending downwardly therefrom, relatively movable means coaxially mounted over the adapter member for attachment thereby to the gear lever, and the movable one of which carries an element projecting radially outwardly from the lever in close proximity to and below the said operating knob for engagement by the fingers of an operator with hand thereon and oscillatable in a horizontal plane by the fingers of the operator without removal of the hand from said knob, and the other of the means embodying stationary contacts located upon respective sides of a neutral point and adapted for contact independently by the oscillatable means as the same is turned in the one direction or the other.

4. Electrical switching mechanism for a self-propelled vehicle having a gear-shift lever with operating knob and comprising an adapter member extending downwardly therefrom and embodying an internally threaded collar provided with an outer shoulder and adapted to be threaded over the outer end of the gear-shift lever, a sleeve shouldered at its outer end and fitting over the end of the said lever for engagement with the collar thereon and to extend downwardly therefrom the knob having means for engaging the sleeve shoulder, an operating handle extending radially from the sleeve a predetermined distance below the knob, a contact part mounted on said sleeve to rotate with the operating handle in either direction, and cooperating stationary contact means carried by the said sleeve for electrical contact with the rotatable part as the latter is rotated in either direction.

5. Electrical switching mechanism for a self-propelled vehicle having a gear-shift lever with operating knob and comprising relatively movable means adapted to be mounted coaxially over the free end of said lever immediately below the said knob and extending downwardly therefrom, and the movable one of which carries an element projecting radially outwardly from the lever in close proximity to and below the said operating knob for engagement by the fingers of an operator with hand thereon and oscillatable in a horizontal plane by the fingers of the operator without removal of the hand from said knob, and the other of the means embodying stationary contacts located upon respective sides of a neutral point for releasably positioning and locking the movable means when shifted through manipulation of said oscillatable means, the said contacts being adapted to be energized independently by the oscillatable means as the same is turned in the one direction or the other to engage a respective stationary contact.

6. Electrical switching mechanism for a self-propelled vehicle having a gear-shift lever with operating knob and comprising relatively movable means adapted to be mounted coaxially over the free end of said lever immediately below the said knob and extending downwardly therefrom, and the movable one of which carries an element projecting radially outwardly from the lever in close proximity to and below the said operating knob for engagement by the fingers of an operator with hand thereon and oscillatable in a horizontal plane by the fingers of the operator without removal of the hand from said knob, and the other of the means embodying spring-urged ball contacts located upon respective sides of a neutral point for releasably positioning and locking the movable means when shifted through manipulation of said oscillatable means, the said contacts being adapted to be energized independently by the oscillatable means as the same is turned in the one direction or the other to engage a respective stationary contact.

7. A 3-point signal switch for use with self-propelled vehicles, comprising attaching means, a member movably mounted coaxially therewith, means associated with the movable member adapted for manual engagement to oscillate said movable member upon either side of a neutral position, three independent terminal elements including two end and an intermediate terminal with yieldable contacts and carried by the attaching means in juxtaposition to the movable member, the two end terminal elements determining a neutral position of the movable member and effecting a yieldable positive hold therewith, and an end and intermediate terminal element determining the respective operative positions with one of said terminal elements effecting a yieldable positive hold with said movable member.

8. A 3-point signal switch for use with self-propelled vehicles, comprising attaching means, an annular member movably mounted about the attaching means coaxially therewith, a rod projecting radially outwardly therefrom for manual engagement to oscillate the annular member upon either side of a neutral position, three equally-displaced insulated spring-urged ball terminals carried by the attaching means in juxtaposition to the annular member, the latter being provided with a pair of recesses displaced equally from the neutral position conformably to the spacing of the said ball terminals, said recesses being adapted normally to be engaged by the two outer ball terminals for determining the neutral position of the annular member and effecting a yieldable positive hold between the same and the attaching means, and the intermediate ball terminal when engaging one or the other of the said recesses determining the respective operative positions with one of said terminal elements and effecting also a yieldable positive hold between the annular member and the attaching means.

EDWARD T. CONDON.